US011397946B2

(12) United States Patent
Kalgi et al.

(10) Patent No.: US 11,397,946 B2
(45) Date of Patent: Jul. 26, 2022

(54) SYSTEMS AND METHODS FOR MERCHANT MOBILE ACCEPTANCE

(71) Applicant: Visa International Service Association, San Francisco, CA (US)

(72) Inventors: Avinash Kalgi, Kirkland, WA (US); Qian Wang, Mercer Island, WA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 831 days.

(21) Appl. No.: 15/992,438

(22) Filed: May 30, 2018

(65) Prior Publication Data

US 2018/0276659 A1 Sep. 27, 2018

Related U.S. Application Data

(63) Continuation of application No. 14/157,399, filed on Jan. 16, 2014, now Pat. No. 10,013,690.

(51) Int. Cl.
*G06Q 20/38* (2012.01)
*G06Q 20/20* (2012.01)
*G06Q 20/32* (2012.01)

(52) U.S. Cl.
CPC .......... *G06Q 20/382* (2013.01); *G06Q 20/20* (2013.01); *G06Q 20/204* (2013.01); *G06Q 20/32* (2013.01); *G06Q 20/322* (2013.01); *G06Q 20/3823* (2013.01)

(58) Field of Classification Search
CPC .... G06Q 20/20; G06Q 20/204; G06Q 20/322; G06Q 20/382; G06Q 20/3823

USPC ......................................................... 705/64
See application file for complete search history.

(56) References Cited

U.S. PATENT DOCUMENTS

| 7,568,621 | B2 | 8/2009 | Von Mueller et al. |
| 7,810,729 | B2 | 10/2010 | Morley, Jr. |
| 7,896,248 | B2 | 3/2011 | Morley, Jr. |
| 9,378,499 | B2 | 6/2016 | Quigley et al. |
| 2003/0221100 | A1* | 11/2003 | Russ ................. H04N 21/4405 713/153 |
| 2008/0040276 | A1 | 2/2008 | Hammad et al. |
| 2011/0106710 | A1 | 5/2011 | Reed et al. |
| 2011/0238511 | A1* | 9/2011 | Park ................. G06Q 20/3823 705/17 |

(Continued)

OTHER PUBLICATIONS

U.S. Appl. No. 14/157,399 , "Final Office Action", dated Dec. 12, 2016, 32 pages.

(Continued)

*Primary Examiner* — Mohammad A. Nilforoush
*Assistant Examiner* — Wodajo Getachew
(74) *Attorney, Agent, or Firm* — Kilpatrick Townsend & Stockton LLP

(57) ABSTRACT

Systems and methods are provided for merchant mobile acceptance of user device data. For example, a method comprises receiving encrypted user device data and reader metadata from a merchant mobile device, determining a device reader API and device reader encryption scheme using the device reader metadata, parsing the encrypted user device data using the device reader API to determine encrypted personal information, and decrypting the encrypted personal information using the reader encryption scheme.

19 Claims, 13 Drawing Sheets

(56) References Cited

U.S. PATENT DOCUMENTS

| | | |
|---|---|---|
| 2012/0126007 A1* | 5/2012 | Lamba ................ G06Q 20/322 |
| | | 235/437 |
| 2012/0130903 A1 | 5/2012 | Dorsey et al. |
| 2013/0144792 A1* | 6/2013 | Nilsson ................ G07F 7/1091 |
| | | 705/67 |
| 2013/0275307 A1 | 10/2013 | Khan |
| 2015/0134539 A1 | 5/2015 | Kapur |
| 2015/0134962 A1* | 5/2015 | Mahajan ............... H04L 63/061 |
| | | 713/171 |
| 2015/0199682 A1 | 5/2015 | Kalgi et al. |
| 2016/0063496 A1 | 3/2016 | Royyuru et al. |

OTHER PUBLICATIONS

U.S. Appl. No. 14/157,399 , "Non-Final Office Action", dated Aug. 18, 2016, 29 pages.

* cited by examiner

| USER DEVICE DATA FORMAT 810 | NAME — 811 | PAN (Personal Information) — 812 | EXP. DATE — 813 |
|---|---|---|---|
| USER DEVICE DATA 820 | JOHN SMITH — 821 | 4117-7312-4567-6147 — 822 | 11/2018 — 823 |
| ENCRYPTED USER DEVICE DATA 830 | JOHN SMITH — 831 | NDExNy03MzEyLTQ1NjctNjE1Nw== — 832 | 11/2018 — 833 |

*FIG. 8*

SYSTEMS AND METHODS FOR MERCHANT MOBILE ACCEPTANCE

CROSS-REFERENCE TO RELATED APPLICATIONS

This application is a non-provisional continuation application of and claims the benefit of and priority to U.S. patent application Ser. No. 14/157,399, entitled, "SYSTEMS AND METHODS FOR MERCHANT MOBILE ACCEPTANCE," filed Jan. 16, 2014, which is herein incorporated by reference in its entirety for all purposes.

BACKGROUND

As the connectivity and capability of mobile devices increases, the desire to use mobile devices such as cell phones and tablet computers as point-of-sale (POS) terminals continues to grow. For example, merchant mobile acceptance of credit cards, debit cards, and other payment devices provides consumers and merchants with added portability and convenience. However, with this convenience, more opportunities for fraud and theft of data can exist.

Therefore, it is desirable to provide new systems and methods for merchant mobile acceptance to address such issues.

SUMMARY

Embodiments of the invention introduce systems and methods for merchant mobile acceptance of user device data.

One embodiment of the invention discloses a method comprising receiving encrypted user device data and reader metadata from a merchant mobile device, determining a device reader API and device reader encryption scheme using the device reader metadata, parsing the encrypted user device data using the device reader API to determine encrypted personal information, and decrypting the encrypted personal information using the reader encryption scheme.

One embodiment of the invention discloses a server computer. The server computer comprises a processor and a non-transitory computer-readable storage medium, comprising code executable by the processor for implementing a method comprising receiving encrypted user device data and reader metadata from a merchant mobile device, determining a device reader API and device reader encryption scheme using the device reader metadata, parsing the encrypted user device data using the device reader API to determine encrypted personal information, and decrypting the encrypted personal information using the reader encryption scheme.

One embodiment of the invention discloses a computer-implemented method comprising reading user device data from a portable user device, wherein the user device data comprises personal information, encrypting at least a portion of the user device data to generate encrypted user device data comprising encrypted personal information, and sending the encrypted user device data and device reader metadata to a mobile device, wherein the encrypted user device data comprises encrypted personal information, wherein the device reader metadata is operable to determine a device reader API and a device reader encryption scheme, and wherein the encrypted personal information is decryptable using the device reader encryption scheme.

Further details regarding embodiments of the invention can be found in the Detailed Description and the Figures.

BRIEF DESCRIPTION OF THE DRAWINGS

FIG. 8 shows an example of a user device data format, user device data, and encrypted user device data.

DETAILED DESCRIPTION

Figure 1:
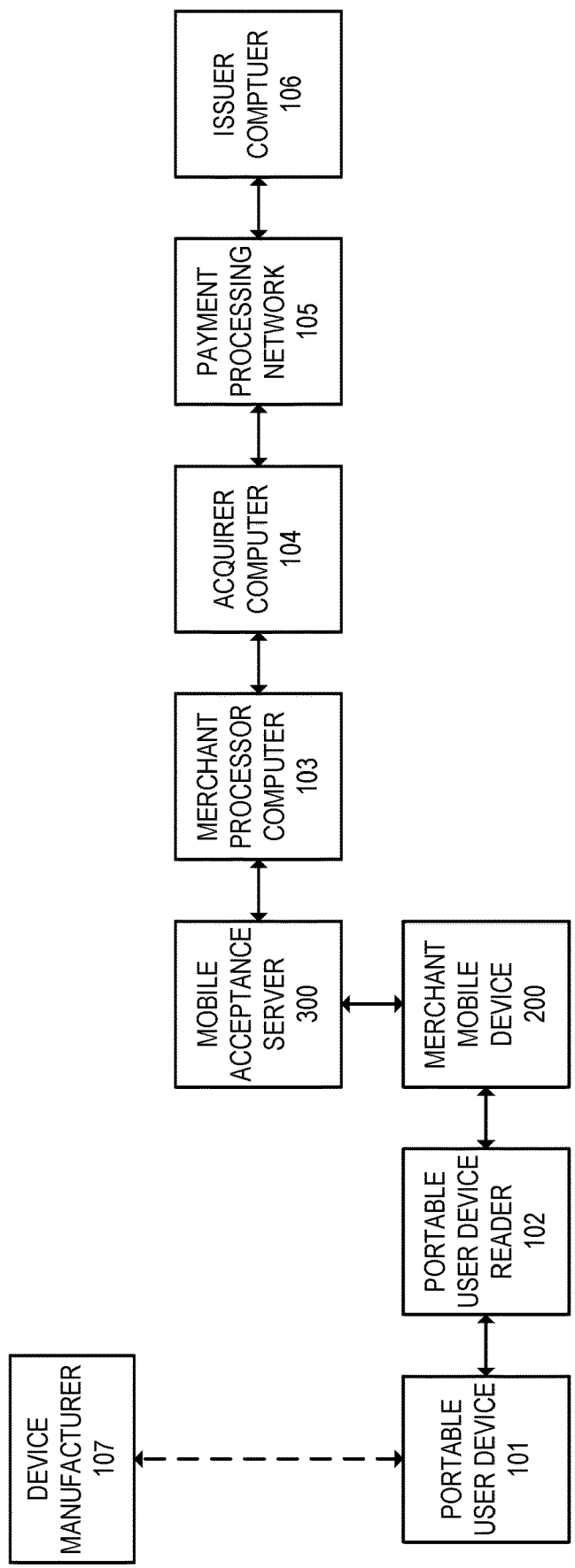
FIG. 1 shows a system according to an embodiment of the invention.

Prior to discussing embodiments of the invention, description of some terms may be helpful in understanding embodiments of the invention.

The term "server computer" may include a computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "user device data" may include any data or information associated with a portable user device. Examples of user device data may include a name of a user associated with the portable user device, an organization associated with the portable user device, and an expiration date of the portable user device. The user device data may be stored on the portable user device in any suitable manner. For example, user device data may be stored as magnetic track data, or in a computer-readable memory.

In some cases, user device data may include "personal information." Personal information may include any potentially sensitive data or information associated with a user or portable user device. Examples of personal information may include a primary account number (PAN) associated with the device, a social security number associated with the user, or a verification value associated with the device.

A "user device data format" may include any information relating to the structure or format of user device data. For example, a user device data format may include information regarding one or more data fields included in the user device data, the ordering of the fields, the length of the fields, etc.

The term "encrypted user device data" may include any data or information including user device data, wherein at least some of the user device data is encrypted, obfuscated, or otherwise protected. In some cases, personal information included in the user device data may be encrypted (i.e., "encrypted personal information"), and other user device data may remained unencrypted.

The term "device reader metadata" may include any data or information associated with a portable user device reader. For example, device reader metadata may include information relating to a manufacturer of the device reader, a model of the device reader, or a type of the device reader. In some embodiments of the invention, the device reader metadata may be usable to retrieve additional data or information associated with the portable user device reader, such as a device reader API or device reader encryption scheme.

The term "device reader API" may include any data, software, executable code, or other information used to process user device data and encrypted user device data. A device reader API may include, for example, a user device data format and executable code to parse user device data and encrypted user device data (e.g., to determine encrypted personal information). In some cases, different portable user device readers may require different device reader APIs.

The term "device reader encryption scheme" may include any data relating to an encryption method associated with encrypted user device data. For example, the device reader encryption scheme may include a key length, an encryption algorithm (e.g., DUKPT), and information used to determine a decryption key that may be used to decrypt the encrypted user device data (e.g., a key serial number).

It should be noted that the although the terms above may include a meaning relating to payment transactions, embodiments of the invention are not so limited. For example, embodiments of the invention may generally apply to any suitable methods of encrypting and decrypting user device data.

Embodiments of the invention provide many technical advantages. For example, by sending encrypted user device data and device reader metadata to a mobile acceptance server to be parsed, embodiments of the invention provide the advantage of allowing a mobile acceptance application running on a merchant mobile device to interface with a variety of portable user device readers, each of which may be associated with a different user device data format and encryption scheme, without requiring the merchant acceptance application to include device reader APIs for each portable user device reader. This reduces the storage and processing requirements for the mobile acceptance application, and increases the speed of the merchant mobile device.

In addition, embodiments of the invention enable a mobile acceptance application to interface with new devices without requiring software updates. Since embodiments of the invention do not require the merchant acceptance application to include software to process each portable user device reader, embodiments enable the merchant acceptance application to interface with portable user device readers released after the mobile acceptance application was loaded onto the merchant mobile device. This may be especially advantageous in some scenarios in which a merchant mobile device may be commonly used, such as when access to the internet for software updates may be sporadic, bandwidth may be limited, or data usage caps may exist.

Embodiments of the invention provide the further advantage of allowing merchants to securely transmit personal information to a mobile acceptance server, without risking compromise of the data on the merchant mobile device. In some embodiments, the merchant mobile device may be a general-purpose mobile device such as a tablet running iOS™ or Android™ operating systems. Accordingly, the security of any sensitive data that is visible to the mobile acceptance application may not be guaranteed. However, since embodiments encrypt user device data before being received by the mobile acceptance application, and do not decrypt the encrypted user device data until after it is received by the mobile acceptance server, any unscrupulous applications running on the merchant mobile device cannot compromise the data.

The above examples highlight only a few of the advantages of the merchant mobile acceptance systems described herein.

I. MERCHANT MOBILE ACCEPTANCE SYSTEMS

FIG. 1 shows a system according to an embodiment of the invention. The system comprises a user (not shown) who may operate a portable user device 101. The user may use portable device 101 to conduct payment transactions at a portable user device reader 102 connected to a merchant mobile device 200. Merchant mobile device 200 may be connected to mobile acceptance server 300. Mobile acceptance server 300 may be connected to merchant processor computer 103. Merchant processor computer 103 may be connected to acquirer computer 104. Acquirer computer 104 may be connected to issuer computer 106 via payment processing network 105. Portable user device 101 may be manufactured by device manufacturer 107, which in some embodiments may be associated with the issuer of portable user device 101.

A "portable user device reader" 102 may include any device operable to read a portable user device 101. The portable user device reader 102 may be operable to read credit cards, debit cards, smart cards, contactless devices, or any other suitable portable user device 101. Accordingly, portable user device reader 102 may comprise a magnetic card reader, EMV interface, contactless interface, or other hardware. In some cases, portable user device reader 102 may be a peripheral device connected to a merchant mobile device 200 (e.g., through a USB cable, headphone jack, or any other suitable interface).

A "merchant mobile device" 200 may include any mobile device operable to conduct a transaction. For example, merchant mobile device 200 may be a tablet, smart phone, laptop, PDA, or netbook. In some cases, the merchant mobile device 200 may be a specialized device for conducting transactions. In other cases, the merchant mobile device 200 may be general-purpose. For example, merchant mobile device 200 may run a mobile operating system such as iOS™ or Android™.

A "mobile acceptance server" 300 may include any server computer operable to receive encrypted user device data and device metadata. In various embodiments, mobile acceptance server 300 may be associated with a merchant processor 103, acquirer 104, payment processing network 105, or issuer 106.

As used herein, an "issuer" may typically refer to a business entity (e.g., a bank) that maintains financial accounts for a user and often issues a portable user device 101 such as a credit or debit card to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities (e.g., merchant processor computer 103, acquirer computer 104, payment processing network 105, and issuer computer 106) may comprise one or more computer apparatuses to enable communications, or to perform one or more of the functions described herein.

The payment processing network 105 may include data processing subsystems, networks, and operations used to support and deliver certificate authority services, authorization services, exception file services, and clearing and settlement services. An example of a payment processing network may include VisaNet™ Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 105 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 105 may use any suitable wired or wireless network, including the Internet.

In a typical purchase transaction, the user purchases a good or service at a merchant mobile device 200 using a portable user device 101. The user's portable user device 101 can interact with an portable user device reader 102 connected to the merchant mobile device 200. For example, the user may tap the portable user device 101 against an NFC reader in the portable user device reader 102. Alternately, the user may indicate payment details to the merchant electronically, such as in an online transaction.

Figure 7:
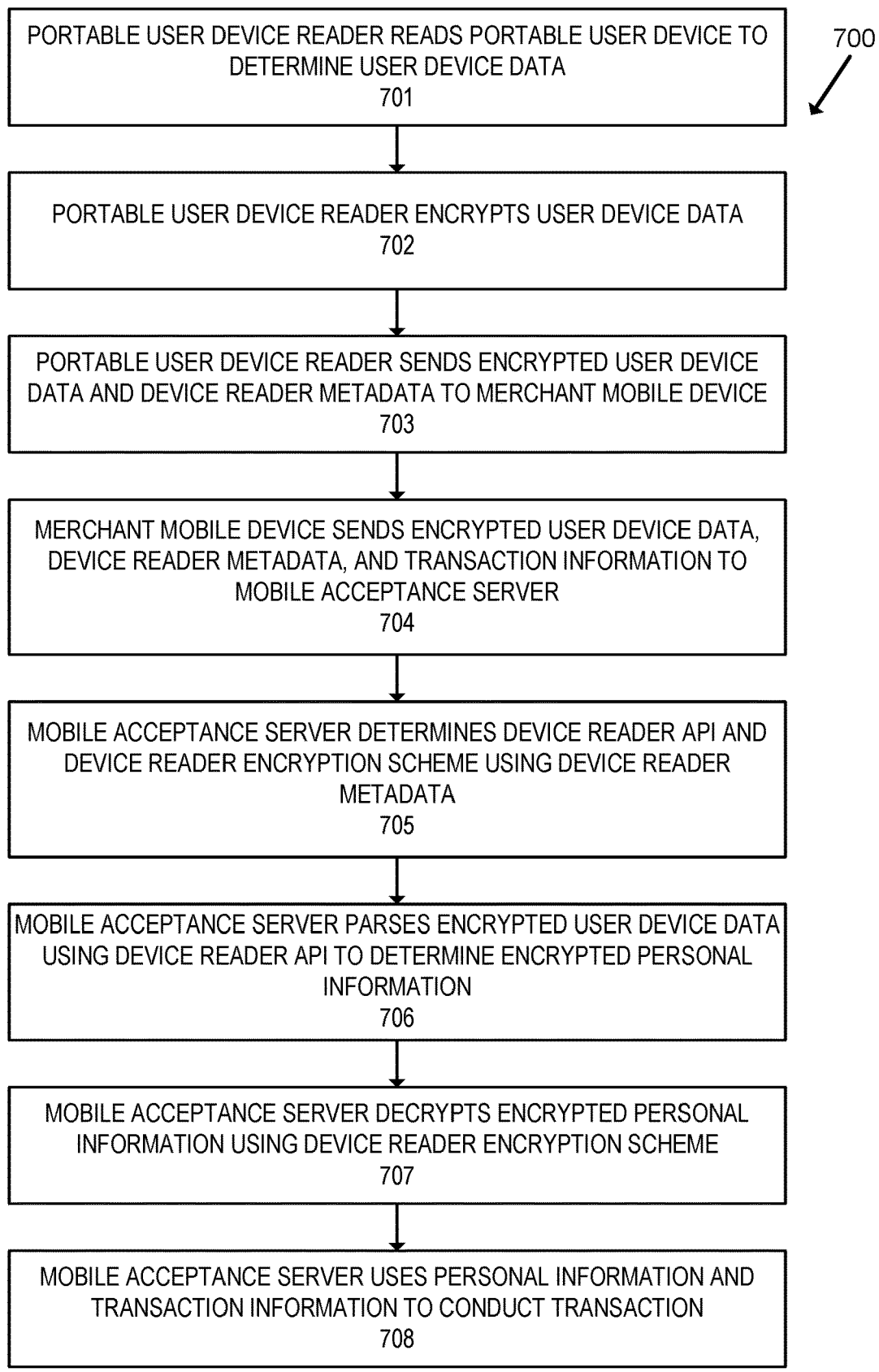
FIG. 7 shows a method for conducting a transaction using user device data read by a portable user device reader.

The merchant mobile device 200 may receive encrypted user device data including personal information such as payment information, and send the encrypted user device data and device reader metadata to a mobile acceptance server 300. In some embodiments, this may be performed in accordance with method 700 as shown in FIG. 7. Mobile acceptance server 300 may then generate an authorization request message for the transaction, or may cause merchant processor computer 103 to generate an authorization request message.

The authorization request message is then forwarded to the acquirer computer 104. After receiving the authorization request message, the authorization request message is then sent to the payment processing network 105. The payment processing network 105 then forwards the authorization request message to the corresponding issuer computer 106 associated with the issuer of the portable user device 101.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 106 receives the authorization request message, the issuer computer 106 sends an authorization response message back to the payment processing network 105 to indicate whether or not the current transaction is authorized (or not authorized). The payment processing network 105 then forwards the authorization response message back to the acquirer computer 104. The acquirer computer 104 then sends the response message back to the merchant processor computer 103.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

After the merchant processor computer 103 receives the authorization response message, the merchant processor computer 103 may then provide the authorization response message to the merchant mobile device 200. The response message may be displayed by the merchant mobile device 200, or may be printed out on a receipt. Alternately, if the transaction is an online transaction, the merchant may provide a web page or other indication of the authorization response message.

At the end of the day, a normal clearing and settlement process can be conducted by the payment processing network 105. A clearing process is a process of exchanging financial details between and acquirer and an issuer to facilitate posting to a user's payment account and reconciliation of the user's settlement position.

Figure 2:
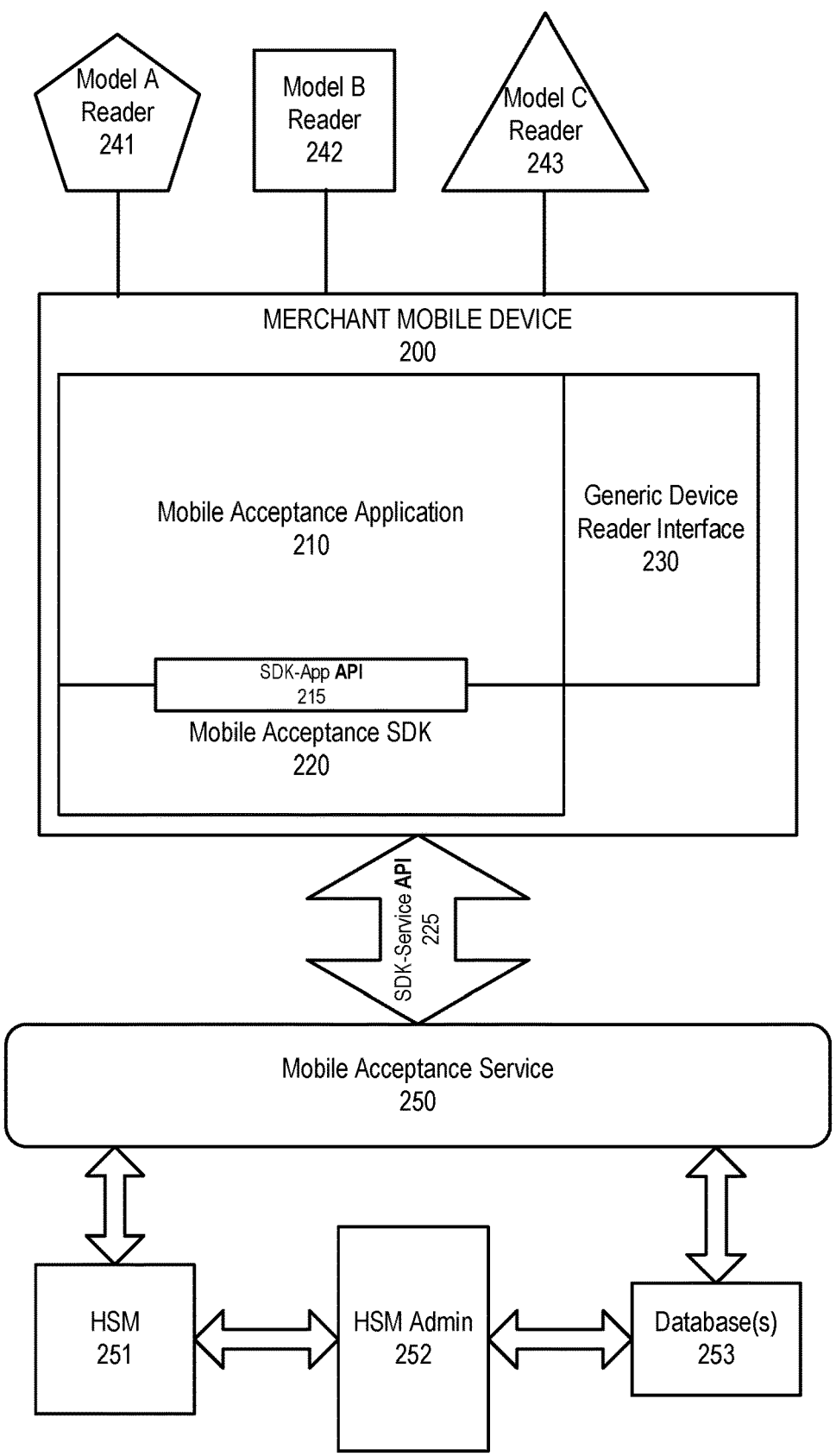
FIG. 2 shows an example of a merchant mobile device interacting with a mobile acceptance service.

FIG. 2 shows an example of a merchant mobile device 200 interacting with portable user device readers 241-243 and a mobile acceptance service 250 in one embodiment of the invention. The merchant mobile device 200 may comprise a mobile acceptance application 210, a mobile acceptance software development kit (SDK) 220, an SDK-Application API 215, and a generic device reader interface 230.

Mobile acceptance application 210 may include any application, program, app, or executable configured to conduct transactions. In some cases, mobile acceptance application 210 may be an application associated with a merchant processor, acquirer, or payment processing network. In such cases, the mobile acceptance application 210 may include point-of-sale (POS) functionality, which may allow a merchant to enter items or services to be purchased by a user, and calculate an amount for a transaction. Mobile acceptance application 210 may interface with a plurality of portable user device readers 241-243 using a generic device interface 230. Mobile acceptance application 210 may interface with a mobile acceptance SDK using an SDK-Application API 215.

Generic device reader SDK 230 may include any libraries, APIs, or other functionality operable to allow mobile acceptance application 210 to communicate with the plurality of portable user device readers 241-243. Typically, generic device reader SDK 230 may include functionality to receive encrypted user device data from the device readers 241-243, and to determine reader metadata associated with the device readers 241-243. For example, if portable user device readers 241-243 are USB peripherals, generic device reader SDK 230 may include a generic USB driver. However, in some cases, SDK 230 may not include functionality to parse the encrypted user device data based on the reader API associated with the reader.

Mobile acceptance SDK 220 may include any libraries, shared objects, or other functionality operable to construct and send messages to a mobile acceptance server 250. In some embodiments, mobile acceptance SDK 220 may be loaded onto merchant mobile device 200 separately from the mobile acceptance application 210. In other embodiments, mobile acceptance SDK 220 may be included as a component of mobile acceptance application 210. Mobile acceptance SDK 225 and mobile acceptance service 250 may interface using SDK-Service API 225.

Mobile acceptance service 250 may include any executable code or other functionality operable to receive encrypted user device data and device metadata and decrypt the user device data. In some embodiments, mobile acceptance service 250 may comprise model specific SDKs or other functionality to parse the encrypted user device data based on the received device metadata. For example, if the encrypted user device data was generated by model A reader 241, the mobile acceptance service may parse the encrypted user device data using a first device reader SDK; if the encrypted user device data was generated by model B reader 242, the mobile acceptance service may parse the encrypted user device data using a second device reader SDK.

Mobile acceptance service 250 may be in communication with a hardware security module (HSM) 251 that stores one or more encryption keys. For example, HSM 251 may store a base derivation key (BDK) used to generate a decryption key for encrypted user device data. The HSM 251 may be managed by an HSM admin 252. The HSM admin 252 and mobile acceptance server may also be in communication with one or more databases 253. In some embodiments, database(s) 253 may include BDK database 400 and API database 500. In some embodiments, database(s) 253 may implement the database model of FIG. 6.

Figure 3:
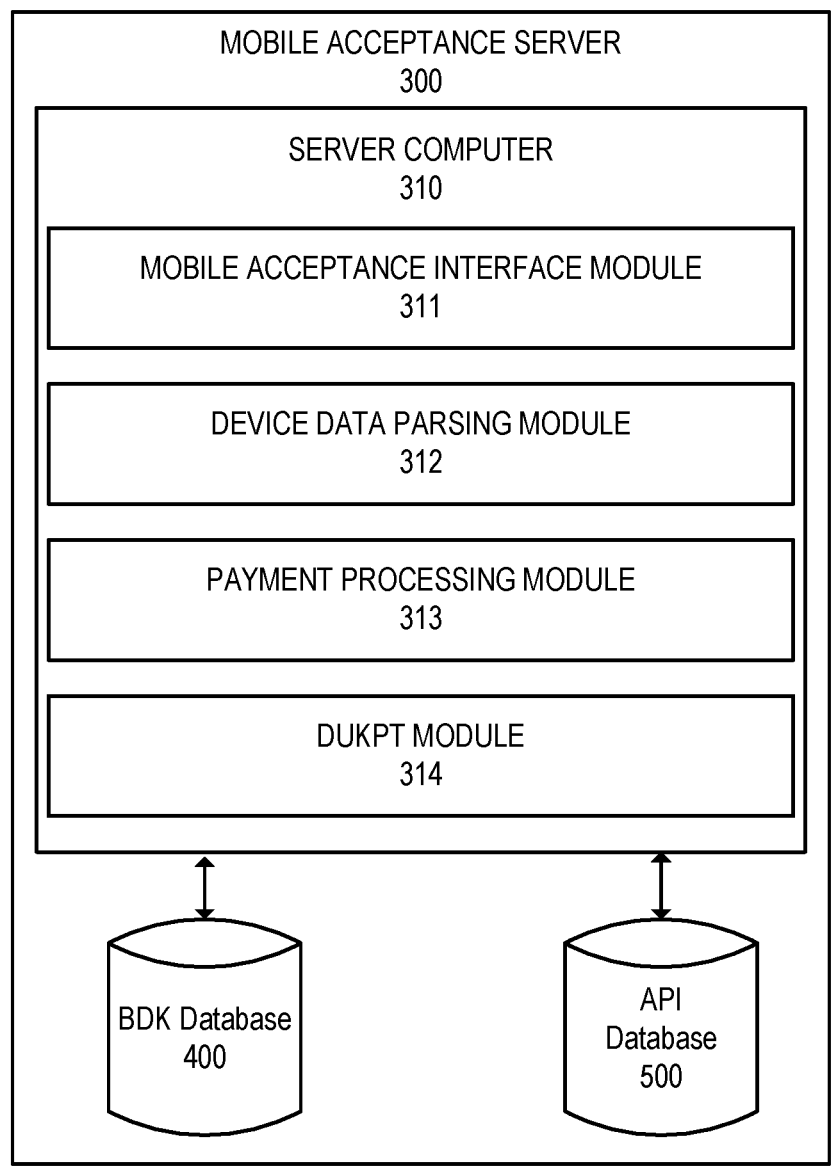
FIG. 3 shows an example of a mobile acceptance server.

FIG. 3 shows an example of a mobile acceptance server 300 according to some embodiments of the invention. The mobile acceptance server 300 may comprise a server computer 310, a BDK database 400, and an API database 500. Typically, the mobile acceptance server 300 may use server computer 310 to receive encrypted user device data, parse the encrypted user device data using API database 500 to determine encrypted personal information, and decrypt the encrypted personal information using BDK database 400.

Server computer 310 may comprise a plurality of modules such as mobile acceptance interface module 311, device data parsing module 312, payment processing module 313, and DUKPT module 314. Modules 311-314 may be implemented using any suitable combination of software and hardware, as can any other modules described herein.

Mobile acceptance interface module 311 may be configured to communicate with merchant mobile devices 200 and receive encrypted user device data and device reader metadata. Typically mobile acceptance service module 311 may implement SDK-Service API 225.

Device data parsing module 312 may be configured to parse encrypted user device data. For example, device data parsing module 312 may use API database 500 to determine a user device data format identifier 504 associated with device reader metadata received from a merchant mobile device 200.

Payment processing module 313 may be configured to conduct a payment transaction using decrypted personal information such as card track data or other payment information. In some embodiments, payment processing module 313 may be configured to generate an authorization request message as described for the system of FIG. 1.

Derived Unique Key Per Transaction (DUKPT) module 314 may be configured to decrypt encrypted data (e.g., encrypted user device data) that has been encrypted using a derived key such as a future key. For example, DUKPT module 314 may be configured to determine a base derivation key (BDK) cryptogram associated with a portable user device reader 102 using received device reader metadata. DUKPT module 314 may also be configured to derive a decryption key using a BDK and information included in a key serial number (KSN).

BDK database 400 may be used to store data associated with one or BDKs. In some embodiments, BDK database 400 may be operable to retrieve a BDK used by a portable user device reader 102 given device metadata associated with the device reader 102. For example, if all portable user device readers 102 of a certain type use a particular BDK, a record in BDK database 400 may be stored for each portable user device type. An example of a BDK database 400 is shown in FIG. 4.

Figure 5:
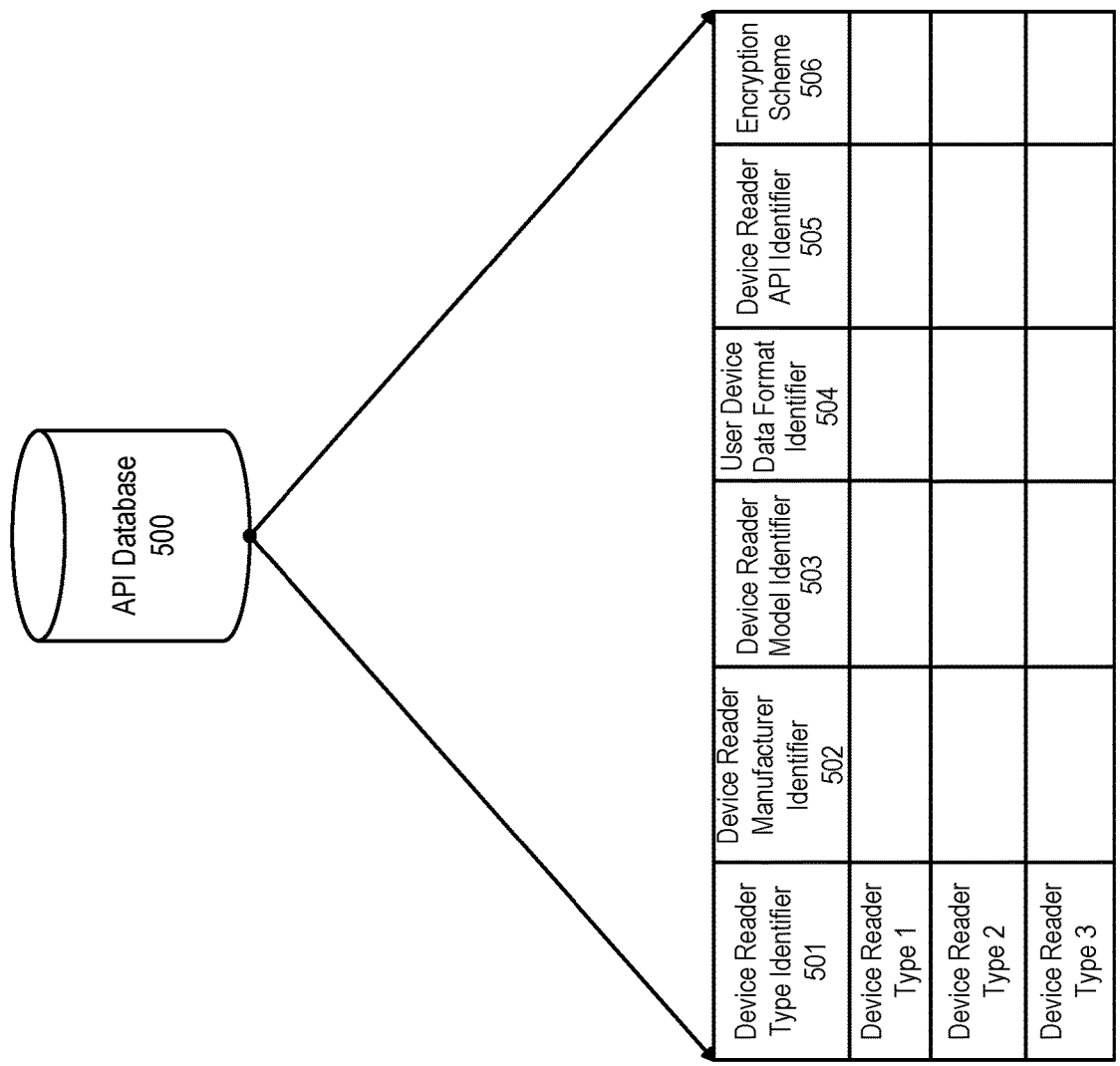
FIG. 5 shows an example of a API database.

API database 500 may be used to store data associating device reader types to device reader APIs or other information used to parse user device data. In some embodiments, API database 500 may be operable to retrieve a device reader API or a device reader encryption scheme used by a portable user device reader 102 given device metadata associated with the device reader 102. For example, if all portable user device readers 102 of a certain type use a particular device reader API, a record in API database 500 may be stored for each portable user device type. An example of an API database 500 is shown in FIG. 5.

A. Example BDK Databases

Figure 4:
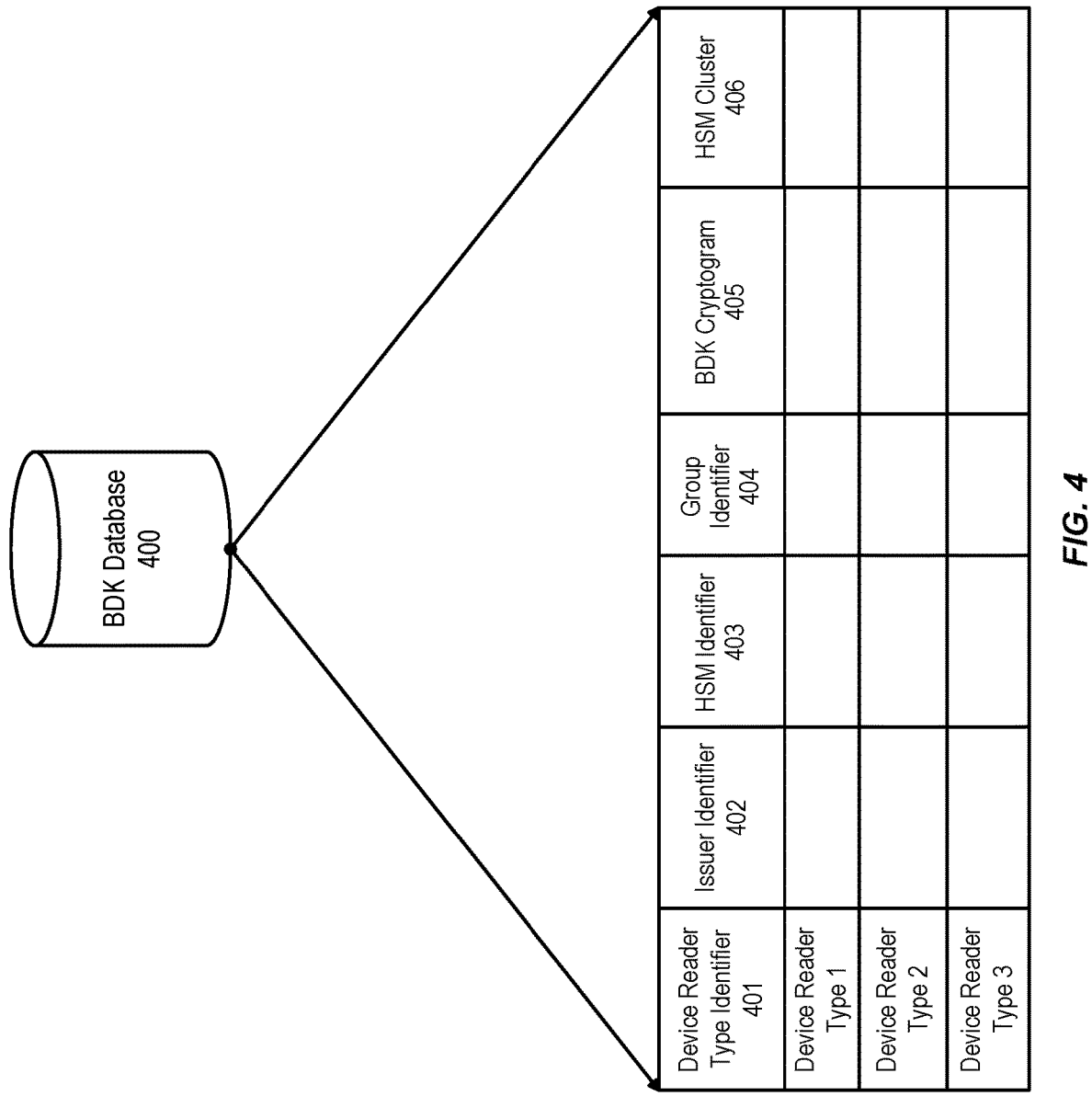
FIG. 4 shows an example of a base derivation key (BDK) database.

FIG. 4 shows an example of a BDK database according to some embodiments of the invention. The BDK database 400 may have a plurality of fields, including a device reader type identifier 401, issuer identifier 402, hardware security module (HSM) identifier 403, group identifier 404, BDK cryptogram 405, and an HSM cluster 406.

Device reader type identifier 401 may include any identifier suitable for identifying a device reader type. A "device reader type" may include a collection of similar portable user device readers. In some embodiments, a device reader type may include all device readers that use the same device reader API or that may be otherwise processed in the same manner. In various embodiments, the device reader type identifier 401 may include the manufacturer, model, and version of a portable user device reader 102. For example, the device reader type identifier 401 "IDTECH-V1" may indicate a device reader manufactured by IDTECH™ and adhering to a "Version 1" data format. In some embodiments, the device reader type of a portable user device reader 102 may depend on the software or firmware installed on the portable user device reader 102.

Issuer identifier 402 may include any name, number, or other identifier suitable for identifying an issuer. For example, issuer identifier 402 may be an issuer ID number (IID) associated with a portable user device reader 102. In some embodiments, the IID of a portable user device reader 102 may be a number uniquely assigned to a manufacturer. HSM identifier 403 may include any identifier suitable for identifying an HSM used to store a BDK. Group identifier 404 may include any identifier suitable for identifying a BDK within a group of BDKs stored in a HSM. Each combination of an issuer identifier 402, HSM identifier 403, and group identifier 404 may be associated with a unique BDK.

BDK cryptogram 405 may include any cryptogram or other data that includes a BDK. Typically, BDK cryptogram 405 may be specially secured compared to other entries in BDK database 400. For example, BDK cryptogram 405 may be stored in an HSM at a location and format identified by HSM cluster 407.

HSM cluster 406 may include any locator or other information identifying a location of an HSM in which a BDK is stored. For example, HSM cluster 406 may include an IP address used to access the HSM, a port on the IP address, or an HSM format or manufacturer.

B. Example API Databases

FIG. 5 shows an example of an API database 500 according to some embodiments of the invention. The API database 500 may have a plurality of fields, including device reader type identifier 501, device reader manufacturer identifier 502, device reader model identifier 503, user device data format identifier 504, device reader API identifier 505, and encryption scheme 506.

Device reader type identifier 501 may include any identifier suitable for identifying a device reader type. Typically, device reader type identifier 501 may correspond to device reader type identifier 401 in BDK database 400.

Device reader manufacturer identifier 502 may include any identifier suitable to identify a device reader manufacturer corresponding to a device reader type identifier 501. Similarly, device reader model identifier 503 may include any identifier suitable to identify a device reader model corresponding to a device reader type identifier 501. For example, a device reader manufacturer may be "ID TECH" and a device reader model may be "UniPay".

User device data format identifier 504 may include any identifier suitable to identify a user device data format for user device data or encrypted user device data generated by a portable user device reader 102 with an associated device reader type identifier 501. In some embodiments, the user device data format identifier 504 may be a reference to an XML schema or other description of the structure of user device data.

Device reader API identifier 505 may include any identifier suitable to identify a device reader application programming interface (API), software development kit (SDK), software library, or other functionality suitable to decrypt encrypted user device data or parse user device data associated with a device reader type identifier 501. For example, device reader API identifier 505 may identify one of a plurality of APIs from a variety of portable user device reader manufacturers to use to parse user device data generated by a particular portable user device reader.

Encryption scheme 506 may include any data, executable code, or other indication of an encryption scheme associated with a device reader type. Examples of encryption schemes may include encryption algorithms used (e.g., RSA, ECC, TDES, and AES), parameters to the encryption algorithms, and the formatting of the encrypted data.

C. Example Database Models

Figure 6:
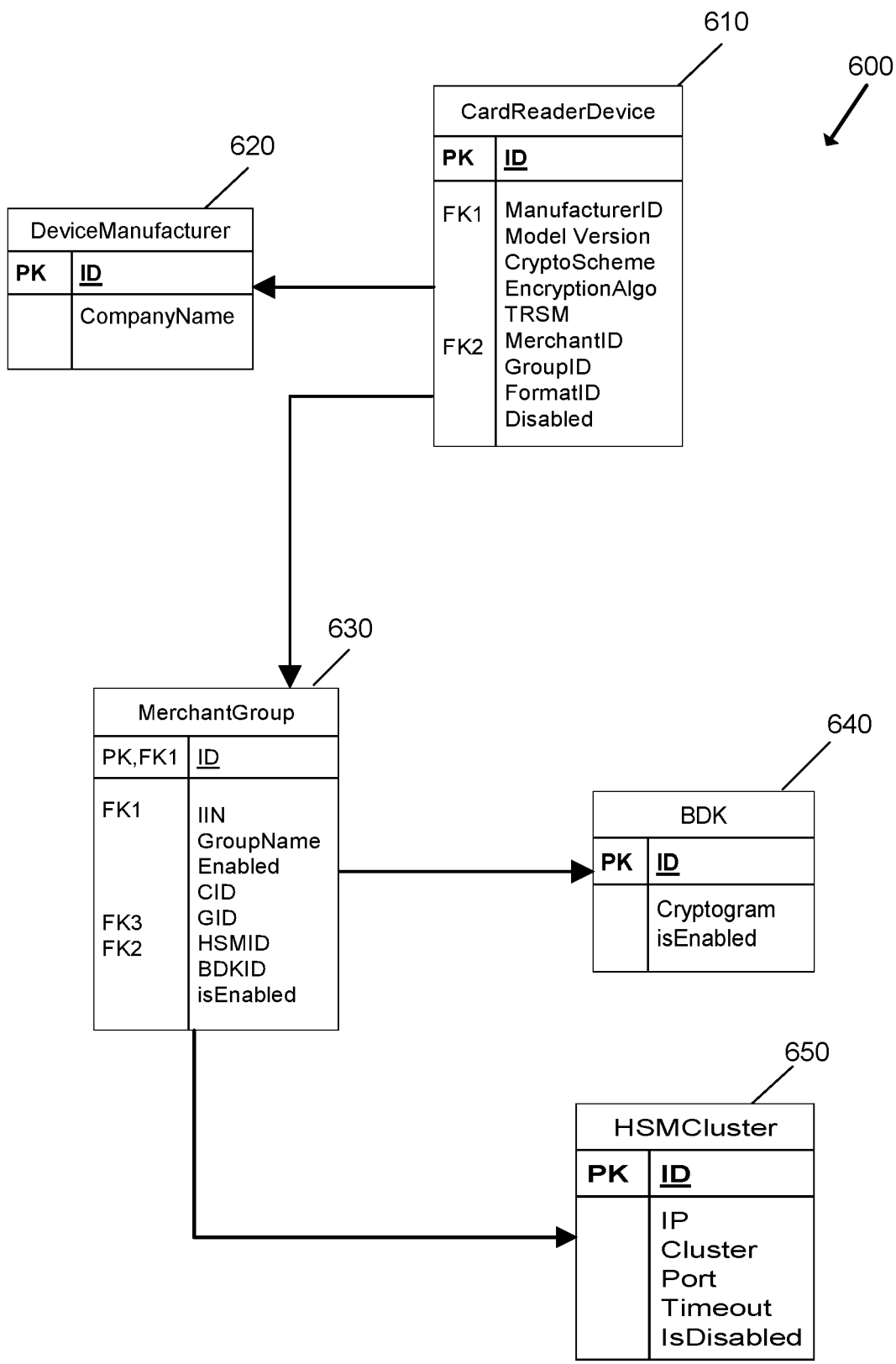
FIG. 6 shows an example of a database schema.

FIG. 6 shows an example of a database model 600 used by a mobile acceptance server in one embodiment of the invention. As shown, database model 600 may include several tables such as CardReaderDevice table 610, DeviceManufacturer table 620, MerchantGroup table 630, BDK table 640, and HSMCluster table 650. Each of tables 610-650 may comprise one or more fields.

In some embodiments, database model 600 may be used instead of, or in addition to, BDK database 400 and API database 500. For example, a database implementing database model 600 may be operable to retrieve a BDK, a device reader API, and a device reader encryption scheme for a portable user device reader 102.

II. MOBILE MERCHANT ACCEPTANCE METHODS

FIG. 7 shows a method 700 for conducting a transaction using encrypted user device data. Typically, the method 700 may be performed when a user initiates a payment transaction at a merchant. For example, the user may swipe or tap portable user device 101 at portable user device reader 102.

At step 701, portable user device reader 102 reads portable user device 101 to determine user device data. Portable user device reader 102 may perform the read in any suitable manner. For example, if portable user device 101 is a credit card or debit card comprising a magnetized data track, portable user device reader 102 may include a magnetic reader. Alternately, if portable user device 101 is a contactless device, portable user device reader 102 may establish a wireless connection with the portable user device 101. In some embodiments, the user device data may also comprise user input. For example, portable user device reader 102 may read a PIN or password entered by a user operating a keypad element of portable user device reader 102. FIG. 8 shows an example of user device data 820 in a user device data format 810.

As shown in FIG. 8, a user device data format 810 may comprise three fields: a field for a user's name 811, a field for personal information such as a PAN 812 associated with the portable user device 101, and a field for an expiration date 813 associated with the portable user device 101. For example, user device data 820 corresponding to the user device data format 810 may have a name 821 of "John Smith", a PAN 822 of "4117-7312-4567-6147", and an expiration date of "11/2018". However, it should be noted that any other format or values for user device data may be used.

At step 702, portable user device reader 102 encrypts the user device data. The term "encrypted user device data" may include any data or information including user device data, wherein at least some of the user device data is encrypted, obfuscated, or otherwise protected. In some cases, personal information included in the user device data may be encrypted (i.e., "encrypted personal information"), and any other user device data may remained unencrypted.

Figure 9:
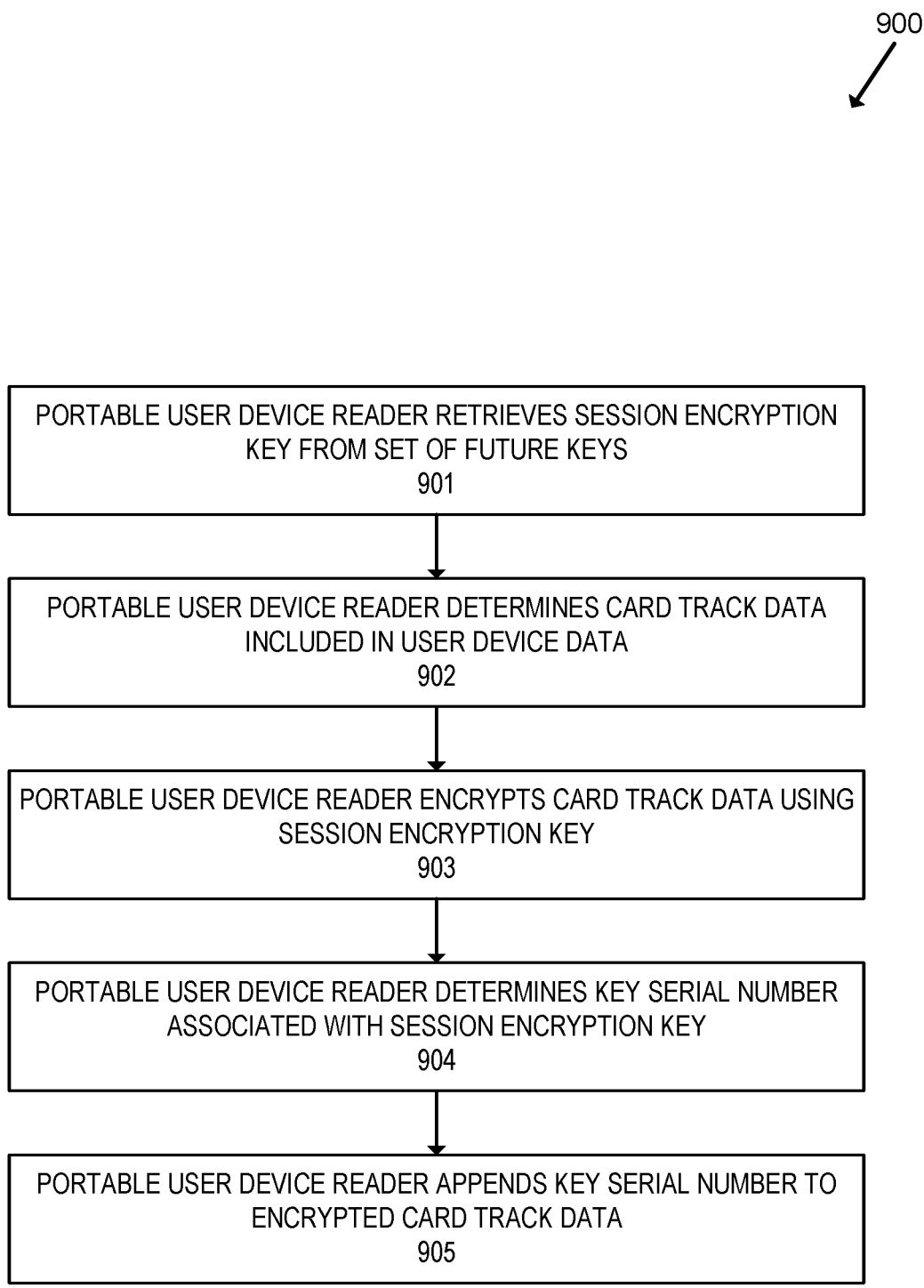
FIG. 9 shows a method for encrypting user device data in accordance with some embodiments of the invention.

The user device data may be encrypted in any suitable manner. In some embodiments, the user device data may be encrypted using an asymmetric encryption algorithm such as ECC or RSA. For example, the user device data may be encrypted using a public key associated with mobile acceptance server 300 and signed using a private key associated with the portable user device reader 102. In other embodiments, the user device data may be encrypted using a symmetric encryption algorithm such as DES or AES. For example, the user device data may be encrypted using a secret key known to mobile acceptance server 300 and portable user device reader 102. In some embodiments, the secret key may be determined in accordance with a derived unique key per transaction (DUKPT) algorithm. In some embodiments, method 900 as shown in FIG. 9 may be used to encrypt the user device data.

FIG. 8 shows example of encrypted user device data 830. The encrypted user device data 830 shown comprises the unencrypted user's name 831 (i.e., "John Smith"), the encrypted PAN 832 (i.e., "NDExNy03MzEyLTQ1NjctNjE1Nw=="), and the unencrypted expiration date (i.e., "11/2018"). However, it should be noted that any set of user device data fields may be encrypted.

At step 703, portable user device reader 102 sends the encrypted user device data and device reader metadata to merchant mobile device 200. Device reader metadata may include any data or information associated with a portable user device reader. For example, device reader metadata may include information relating to a manufacturer of the device reader, a model of the device reader, or a type of the device reader. In some embodiments of the invention, the device reader metadata may be usable to retrieve additional data or information associated with the portable user device reader, such as a device reader API or device reader encryption scheme.

Portable user device reader 102 may send the encrypted user data and device reader metadata to the merchant mobile device 200 in any suitable manner. In some embodiments, the encrypted user data and device reader metadata may be communicated to the merchant mobile device 200 using a standardized format that is shared between multiple device reader manufacturers or models. For example, the device reader metadata may be communicated to merchant mobile device 200 using "vendor ID", "device ID", and other fields present in the Universal Serial Bus (USB) protocol.

At step 704, merchant mobile device 200 sends encrypted user device data, device reader metadata, and transaction information to mobile acceptance server 300. The term "transaction information" may include any information associated with a current transaction, such as the transaction amount, merchant identifier, merchant location, etc., as well as any other information that may be utilized in determining whether to identify and/or authorize a transaction.

At step 705, mobile acceptance server 300 determines a device reader API and a device reader encryption scheme using the received device reader metadata. A "device reader API" may include any data, software, executable code, or other information used to process user device data and encrypted user device data. A device reader API may include, for example, a user device data format and executable code to parse user device data and encrypted user device data (e.g., to determine encrypted personal information). A "device reader encryption scheme" may include any data relating to an encryption method associated with encrypted user device data. For example, the device reader encryption scheme may include a key length, an encryption algorithm (e.g., DUKPT), and information identifying a decryption key (e.g., a BDK) that may be used to decrypt the encrypted user device data.

In some embodiments, mobile acceptance server 300 may use an API database 400 to determine the device reader API and device reader encryption scheme.

At step 706, mobile acceptance server 300 parses the encrypted user device data using the device reader API to determine encrypted personal information. The encrypted personal information may include any potentially sensitive data or information associated with a user or portable user device encrypted in any suitable manner. Examples of personal information may include a primary account number (PAN) associated with the device, a social security number associated with the user, and a verification value associated with the device. For example, for the example encrypted user device data 830 shown in FIG. 8, the encrypted personal information may be the encrypted PAN 832.

Figure 10:
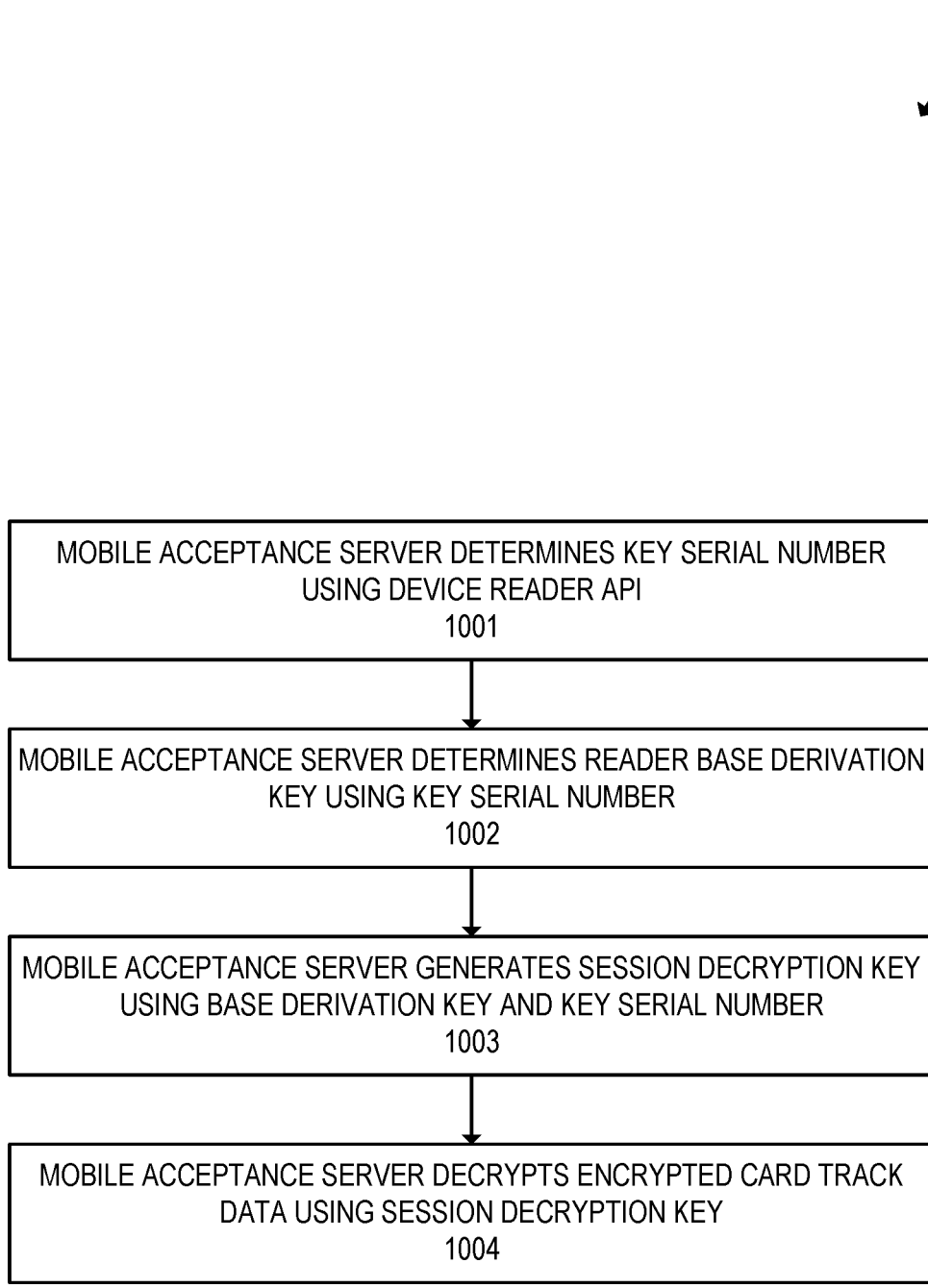
FIG. 10 shows a method for decrypting encrypted personal information using a device reader encryption scheme.

At step 707, mobile acceptance server 300 decrypts the encrypted personal information using the determined device reader encryption scheme. The user device data may be decrypted in any suitable manner. In some embodiments, if the user device data is encrypted using an asymmetric encryption algorithm, the encrypted user device data may be decrypted using a private key associated with mobile acceptance server 300. If the encrypted user device data is signed using a private key associated with the portable user device reader 102, the signature may be verified by a corresponding public key associated with the portable user device reader 102. In other embodiments, if the user device data is encrypted using a symmetric encryption algorithm, the encrypted user device data may be decrypted using a secret key known to mobile acceptance server 300 and portable user device reader 102. In some embodiments, the secret key may be determined in accordance with a derived unique key per transaction (DUKPT) algorithm. In some embodiments, method 1000 as shown in FIG. 10 may be used to decrypt the user device data. For example, for the example encrypted PAN 832 (i.e., "NDExNy03MzEyLTQ1NjctNjE1Nw=="), the corresponding unencrypted PAN 822 (i.e., "4117-7312-4567-6147") may be determined.

At step 708, mobile acceptance server 300 uses the decrypted personal information to conduct a transaction. For example, if the personal information is a PAN, the PAN may be transmitted to a merchant processor computer 103 or acquirer computer 104 as part of an authorization request message for the transaction.

A. Example Encryption Methods

FIG. 9 shows a method 900 for encrypting user device data according to a derived unique key per transaction (DUKPT) encryption scheme. Typically, prior to method 900, an initial encryption key associated with the portable user device reader 102 may be derived using a base derivation key (BDK) stored at a mobile acceptance server 300 and a unique device identifier (e.g., a device ID or tamper-resistant security module ID) associated with the portable user device reader 102. One or more future keys may then be derived using the initial encryption key and one or more counter values. The initial encryption key and future keys may be derived using any suitable key derivation function. The future keys may then be loaded onto the portable user device reader 102. Typically, method 900 may be performed after the portable user device reader 102 reads user device data from the portable user device 101. In some embodiments, method 900 may be performed at step 702 of method 700.

At step 901, portable user device reader 102 retrieves a session encryption key from the set of future keys. In some embodiments, a future key may be chosen such that it is unique to the transaction. For example, a transaction counter may be maintained and incremented by portable user device reader 102 after each transaction. For each subsequent transaction, a future key associated with the current transaction count may be used as the session encryption key.

At step 902, portable user device reader 102 determines card track data included in the user device data associated with portable user device 101. In some embodiments, card track data may include Track 1 or Track 2 data. Track 1 ("International Air Transport Association") may store more information than Track 2, and may include the user's name as well as account number, and other discretionary data. Track 1 data is sometimes used by the airlines when securing reservations with a credit card. Track 2 ("American Banking Association") data may comprise the user's account number, encrypted PIN data, and other discretionary data.

At step 903, portable user device reader 102 encrypts the card track data using the session encryption key. The resulting encrypted card track data may be stored in any suitable form, such as a fixed-length string of bits.

At step 904, portable user device reader 102 determines a key serial number (KSN) associated with the session encryption key. Typically, the KSN includes information that allows a decrypting party (such as the mobile acceptance server 300) to determine or derive a key used to decrypt the encrypted card track data. For example, the KSN may include the unique device identifier associated with the portable user device reader 102 and the transaction counter maintained by the portable user device reader 102.

At step 905, portable user device reader 102 appends the KSN to the encrypted card track data. Typically, the KSN is not encrypted using the session encryption key, so that it may be used to derive a corresponding decryption key.

It should be noted that although method 900 is described as encrypting card track data, any suitable personal information may be similarly encrypted. For example, if the portable user device 101 is a contactless device, a cryptogram, dCVV2, or other data may be similarly encrypted. In another example, the personal information may be payment data entered by a user as part of an electronic commerce transaction.

B. Example Decryption Methods

FIG. 10 shows a method 1000 for decrypting user device data encrypted according to a derived unique key per transaction (DUKPT) encryption scheme. Typically, prior to method 1000, mobile acceptance server 300 parses the encrypted device data using a device reader API. In some embodiments, method 1000 may be performed at step 707 of method 700.

At step 1001, mobile acceptance server 300 determines a KSN using the device reader API. The device reader API may be operable to, for example, determine a number of bits in a string storing the encrypted card track data, and a number of bits in the string storing the KSN. The device reader API may then split the string into a first field comprising the encrypted card track data, and a second field comprising the KSN.

At step 1002, mobile acceptance server 300 determines a device reader base derivation key (device reader BDK) using the KSN. In some embodiments, the KSN may comprise a device reader type identifier 401 that may be used to retrieve a corresponding BDK cryptogram 405 from BDK database 400. In other embodiments, the KSN may comprise one or more identification numbers such as an issuer ID number (IIN), a customer ID (CID), and a group ID (GID). In such embodiments, the IIN, CID, and GID may correspond to issuer identifier 402, HSM identifier 403, and group identifier 404 in BDK database 400, and may be used to retrieve a BDK cryptogram 405.

At step 1003, mobile acceptance server 300 generates the session encryption key using the determined device reader BDK and KSN. In some embodiments, the KSN may comprise a unique device identifier such as a device ID (DID) or a tamper-resistant security module ID (TRSM ID). An initial encryption key for the portable user device reader may be derived from the determined device reader BDK and the unique device identifier. The KSN may also comprise a transaction counter associated with the transaction. A future key associated with the transaction counter may be derived using the initial encryption key and the transaction counter. Typically, the derived future key may be identical to the future key used by the portable user device reader 102 as the session key.

At step 1004, mobile acceptance server 300 decrypts the encrypted card track data using the session encryption key to determine the card track data. The card track data may then be used for any suitable purpose, such as conducting a transaction.

C. Example User Device Data Flows

Figure 11:
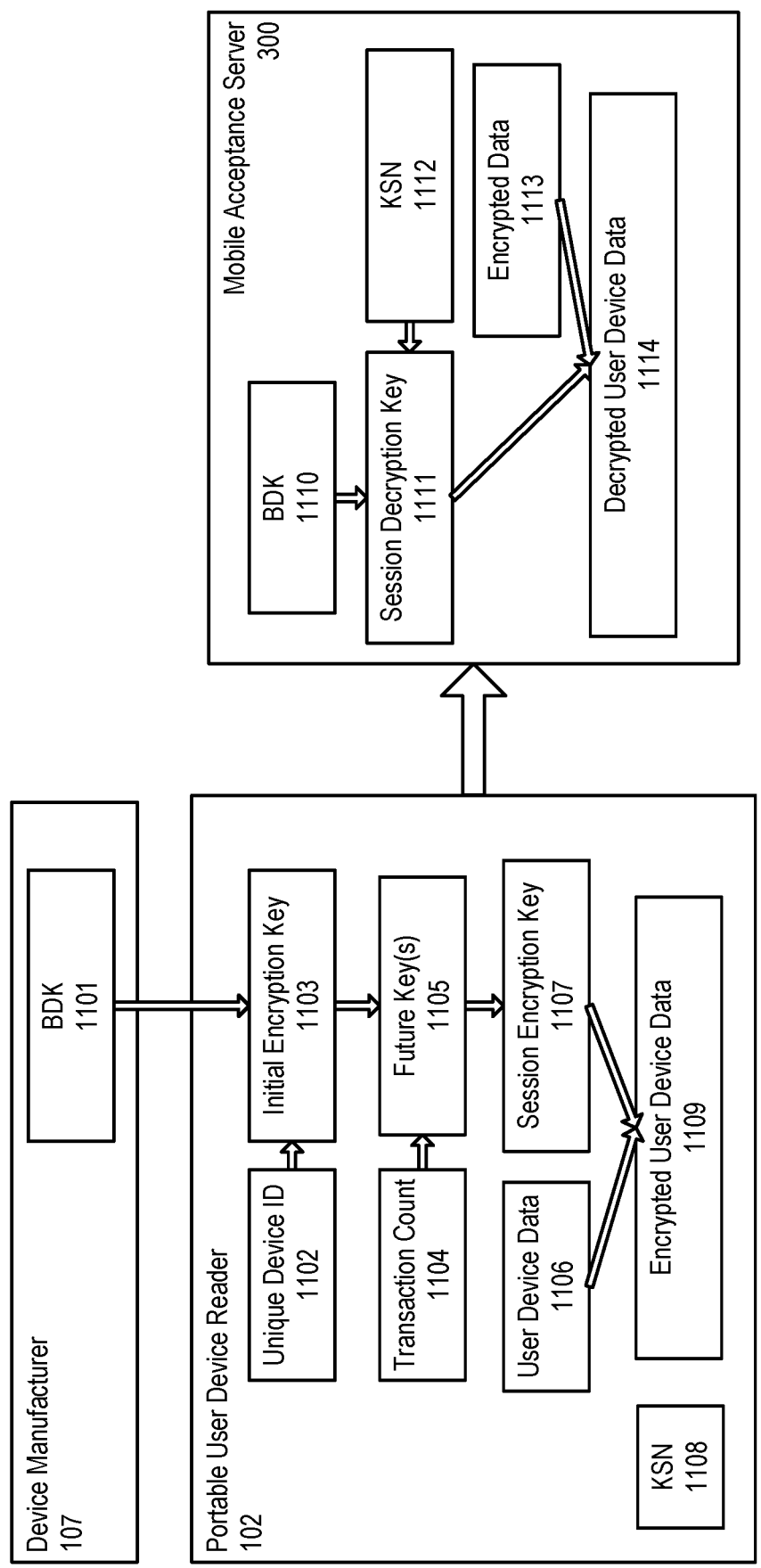
FIG. 11 shows a flow diagram illustrating an encryption and decryption process according to some embodiments of the invention.

FIG. 11 shows a flow diagram illustrating data dependencies according to some embodiments of the invention. As shown, the flow may include device manufacturer 107, portable user device reader 102, and mobile acceptance server 300. Device manufacturer 107, portable user device reader 102, and mobile acceptance server 300 may include one or more data elements 1101-1113.

Base derivation key (BDK) 1101 may be any suitable BDK. As examples, BDK 1101 may be generated by device manufacturer 107, mobile acceptance server 300, or another entity, such as acquirer computer 104, payment processing network 105, or issuer computer 106. Typically, BDK 1101 at device manufacturer 107 may be the same key as BDK 1110 at mobile acceptance server 300. This may be achieved, for example, by the device manufacturer 107 sending the BDK 1101 to mobile acceptance server 300, or mobile acceptance server 300 sending the BDK 1110 to device manufacturer 107.

Initial encryption key 1103 is generated using BDK 1101 and a unique device identifier 1102. In some embodiments, the initial encryption key 1103 may be generated using a key derivation function (KDF). For example, in KDFs that take as input a key and salt, the key may include the BDK 1101, and the salt may include the unique device identifier 1102.

One or more future keys 1105 are generated using initial encryption key 1103 and one or more transaction counts 1104. For example, a first future key 1105 may be generated using the initial encryption key 1103 and a transaction count 1104 of zero, a second future key 1105 may be generated using the initial encryption key 1103 and a transaction count 1104 of one, etc.

Session encryption key 1107 may be chosen from the one or more future keys 1105, and may be used to encrypt user device data 1106 to generate encrypted user device data 1109. In some embodiments, the session encryption key 1107 may be chosen such that a different future key 1105 is used for each transaction conducted by the portable user device reader 102. The encrypted user device data 1109 may be associated with a key serial number (KSN) 1108, which may include unique device identifier 1102, transaction count 1104, an identifier associated with BDK 1101, or any other suitable data to determine a session decryption key 1111 corresponding to the session encryption key 1107.

Once KSN 1108 and encrypted user device data 1109 are sent by portable user device reader 102, they may be received by merchant acceptance server 300 as KSN 1112 and encrypted data 1113.

A session decryption key 1111 may be determined from BDK 1110 and the received KSN 1112. For example, if the KSN 1112 includes the unique device identifier 1102 and transaction count 1104, the session encryption key 1107 may be regenerated and used as the session decryption key 1111. In some embodiments, in order to determine the session decryption key 1111, mobile acceptance server 300 may use device reader metadata associated with portable user device reader 102. For example, mobile acceptance server 300 may determine a device reader encryption scheme and device reader API associated with the portable user device reader 102.

The session decryption key 1111 may be used to decrypt the encrypted data 1113 to determine the decrypted user device data 1114. Thus, mobile acceptance server 300 may determine user device data 1106 through an encrypted transmission from portable user device reader 102.

III. COMPUTER APPARATUSES

Figure 12:
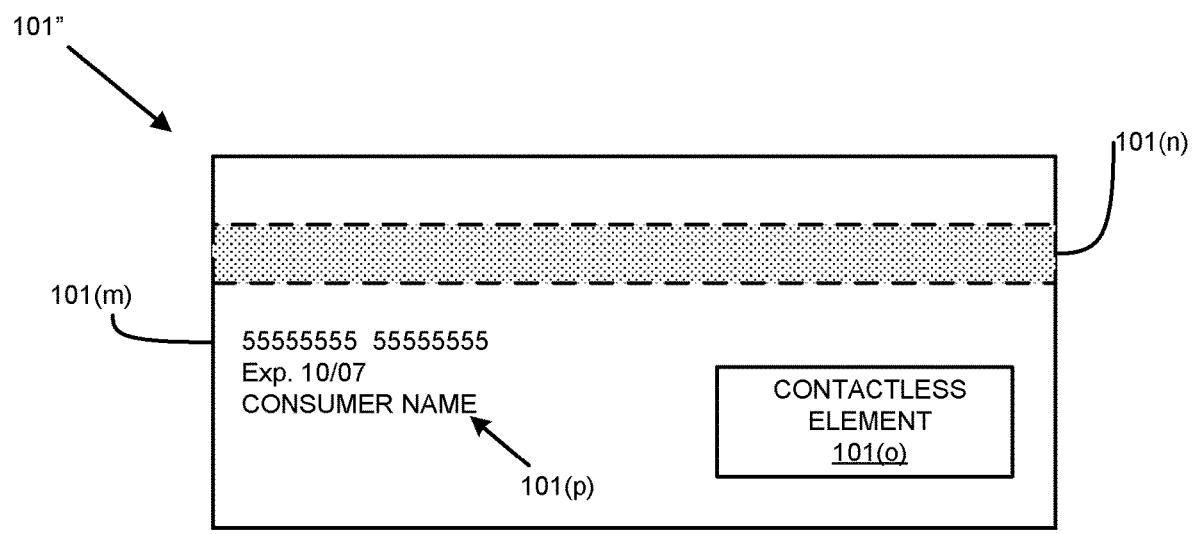
FIG. 12 shows an example of a portable user device.

FIG. 12 shows an example of a payment device 101" in the form of a card. As shown, the payment device 101" comprises a plastic substrate 101(m). In some embodiments, a contactless element 101(o) for interfacing with an access device 102 may be present on, or embedded within, the plastic substrate 101(m). User information 101(p) such as an account number, expiration date, and/or a user name may be printed or embossed on the card. A magnetic stripe 101(n) may also be on the plastic substrate 101(m). In some embodiments, the payment device 101" may comprise a microprocessor and/or memory chips with user data stored in them.

As noted above and shown in FIG. 12, the payment device 101" may include both a magnetic stripe 101(n) and a contactless element 101(o). In some embodiments, both the magnetic stripe 101(n) and the contactless element 101(o) may be in the payment device 101". In some embodiments, either the magnetic stripe 101(n) or the contactless element 101(o) may be present in the payment device 101".

Figure 13:
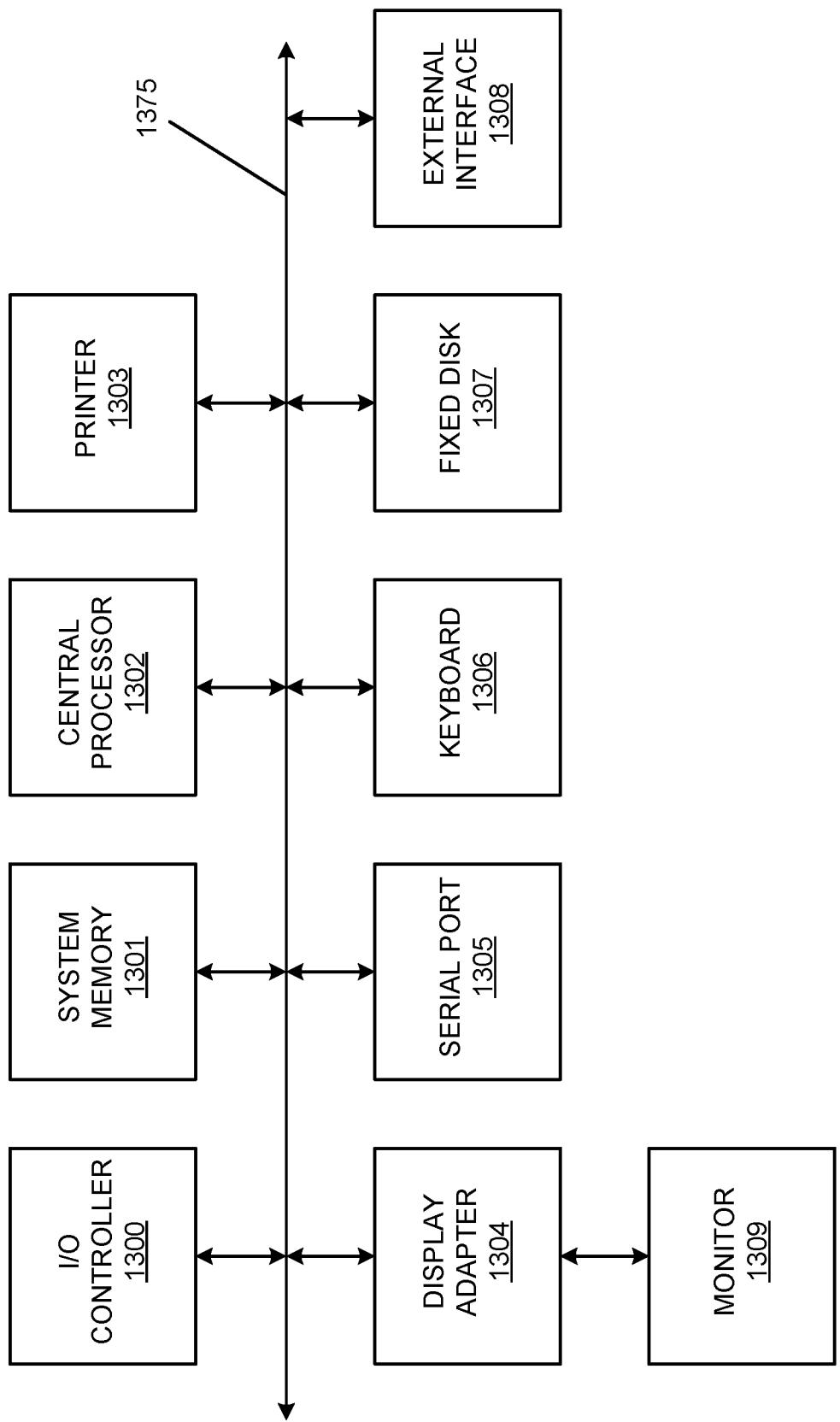
FIG. 13 is a high level block diagram of a computer system that may be used to implement any of the entities or components described for embodiments of the invention.

FIG. 13 is a high level block diagram of a computer system that may be used to implement any of the entities or components described above. The subsystems shown in FIG. 13 are interconnected via a system bus 1375. Additional subsystems include a printer 1303, keyboard 1306, fixed disk 1307, and monitor 1309, which is coupled to display adapter 1304. Peripherals and input/output (I/O) devices, which couple to I/O controller 1300, can be connected to the computer system by any number of means known in the art, such as a serial port. For example, serial port 1305 or external interface 1308 can be used to connect the computer apparatus to a wide area network such as the Internet, a mouse input device, or a scanner. The interconnection via system bus 1375 allows the central processor 1302 to communicate with each subsystem and to control the execution of instructions from system memory 1301 or the fixed disk 1307, as well as the exchange of information between subsystems. The system memory 1301 and/or the fixed disk may embody a computer-readable medium.

IV. ADDITIONAL EMBODIMENTS

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A server computer comprising:
a processor; and
a non-transitory computer-readable medium, comprising code executable by the processor for implementing a method comprising:
receiving, from a mobile device,
(1) encrypted user device data generated from user device data of a portable device by a portable device reader connected to the mobile device, and
(2) portable device reader metadata, wherein the portable device reader metadata includes information indicating a type of the portable device reader;
determining a portable device reader encryption scheme of a plurality of portable device reader encryption schemes using the portable device reader metadata, wherein the type of the portable device reader indicated by the portable device reader metadata is stored in association with the portable device reader encryption scheme of the plurality of portable device reader encryption schemes;

determining a user device data format of a plurality of user device data formats using the portable device reader metadata, wherein the type of the portable device reader indicated by the portable device reader metadata is stored in association with the plurality of user device data formats of the plurality of portable device reader encryption schemes;

parsing the encrypted user device data using the user device data format to extract encrypted personal information and determine a key serial number;

determining a session decryption key using the key serial number; and decrypting the encrypted personal information using the session decryption key and the portable device reader encryption scheme.

2. The server computer of claim 1, wherein the portable device reader metadata comprises a device reader manufacturer identifier and a device reader model identifier.

3. The server computer of claim 2, wherein a device reader API and the portable device reader encryption scheme are determined using an API database comprising a plurality of device reader API identifiers, wherein each device reader API identifier is associated with the device reader manufacturer identifier and the device reader model identifier.

4. The server computer of claim 1, wherein decrypting the encrypted personal information provides personal information comprising payment information, the method further comprising conducting a transaction using the payment information by sending the payment information to a payment processing network to cause the payment processing network to generate an indication of approval of the transaction.

5. The server computer of claim 1, wherein the encrypted personal information is encrypted using a session encryption key retrieved from a plurality of future keys, wherein the method further comprises:
    retrieving a base derivation key using the portable device reader metadata; and
        wherein the session decryption key is derived using the base derivation key and the key serial number.

6. The server computer of claim 1, wherein the encrypted personal information comprises encrypted card track data.

7. The server computer of claim 1, wherein a device reader API and the portable device reader encryption scheme are determined from a plurality of device reader APIs and the plurality of portable device reader encryption schemes, wherein the device reader API is associated with the user device data format that indicates information related to fields included in the encrypted user device data, and wherein at least some of the plurality of device reader APIs are associated with different user device data formats.

8. The server computer of claim 1, wherein the server computer communicates with the mobile device across multiple sessions, and wherein the session decryption key is a unique key generated using a counter corresponding to a current session.

9. A computer-implemented method comprising:
    receiving, by a mobile acceptance server from a mobile device,
        (1) encrypted user device data generated from user device data of a portable device by a portable device reader connected to the mobile device, and
        (2) portable device reader metadata, wherein the portable device reader metadata includes information indicating a type of the portable device reader;
    determining a portable device reader encryption scheme of a plurality of portable device reader encryption schemes using the portable device reader metadata, wherein the type of the portable device reader indicated by the portable device reader metadata is stored in association with the portable device reader encryption scheme of the plurality of portable device reader encryption schemes;
    determining a user device data format of a plurality of user device data formats using the portable device reader metadata, wherein the type of the portable device reader indicated by the portable device reader metadata is stored in association with the user device data formats of the plurality of portable device reader encryption schemes;
    parsing, by the mobile acceptance server, the encrypted user device data using the user device data format to extract encrypted personal information and a key serial number;
    determining a session decryption key using the key serial number; and
    decrypting, by the mobile acceptance server, the encrypted personal information using the session decryption key and the portable device reader encryption scheme.

10. The computer-implemented method of claim 9, wherein the portable device reader metadata comprises a device reader manufacturer identifier and a device reader model identifier.

11. The computer-implemented method of claim 10, wherein a device reader API and the portable device reader encryption scheme are determined using an API database comprising a plurality of device reader API identifiers, wherein each device reader API identifier is associated with the device reader manufacturer identifier and the device reader model identifier.

12. The computer-implemented method of claim 9, wherein the method further comprises:
    determining the user device data format associated with a device reader API using the portable device reader metadata, wherein the encrypted user device data is parsed based on the user device data format.

13. The computer-implemented method of claim 9, wherein decrypting the encrypted personal information provides personal information comprising payment information, the method further comprising conducting, by the mobile acceptance server, a transaction using the payment information by sending the payment information to a payment processing network to cause the payment processing network to generate an indication of approval of the transaction.

14. The computer-implemented method of claim 9, wherein the encrypted personal information is encrypted using a session encryption key retrieved from a plurality of future keys, wherein the method further comprises:
    retrieving, by the mobile acceptance server, a base derivation key using the portable device reader metadata; and
    deriving, by the mobile acceptance server, the session decryption key using the base derivation key and the key serial number, wherein the encrypted personal information is decrypted using the session decryption key.

15. The computer-implemented method of claim 9, wherein the encrypted personal information comprises encrypted card track data.

16. The computer-implemented method of claim 9, wherein the portable device reader encryption scheme indicates an encryption process used to generate the encrypted user device data, and wherein the method further comprises:
deriving the session decryption key based on the encryption process indicated by the portable device reader encryption scheme, wherein the encrypted personal information is decrypted using the session decryption key.

17. The server computer of claim 7, wherein the information related to fields comprises an ordering of the fields.

18. The server computer of claim 7, wherein the information related to fields comprises lengths of the fields.

19. One or more non-transitory computer-readable media collectively having thereon computer-executable instructions that when executed by one or more computers, perform operations comprising at least:
receiving, from a mobile device,
(1) encrypted user device data generated from user device data of a portable device by a portable device reader connected to the mobile device, and
(2) portable device reader metadata, wherein the portable device reader metadata includes information indicating a type of the portable device reader;
determining a portable device reader encryption scheme of a plurality of portable device reader encryption schemes using the portable device reader metadata, wherein the type of the portable device reader indicated by the portable device reader metadata is stored in association with the portable device reader encryption scheme of the plurality of portable device reader encryption schemes;
determining a user device data format of a plurality of user device data formats using the portable device reader metadata, wherein the type of the portable device reader indicated by the portable device reader metadata is stored in association with the user device data formats of the plurality of portable device reader encryption schemes;
parsing the encrypted user device data using the user device data format to extract encrypted personal information and determine a key serial number;
determining a session decryption key using the key serial number; and
decrypting the encrypted personal information using the session decryption key and the portable device reader encryption scheme.

* * * * *